US012675848B2

(12) United States Patent (10) Patent No.: US 12,675,848 B2

Vaziri (45) Date of Patent: Jul. 7, 2026

(54) METHOD AND APPARATUS FOR A SOFTWARE ENABLED HIGH RESOLUTION ULTRASOUND IMAGING DEVICE

(71) Applicant: Optics Innovation LLC, Portland, ME (US)

(72) Inventor: Masoud Vaziri, Richardson, TX (US)

(73) Assignee: Optics Innovation LLC, Portland, ME (US)

( * ) Notice: Subject to any disclaimer, the term of this patent is extended or adjusted under 35 U.S.C. 154(b) by 0 days.

(21) Appl. No.: 19/020,675

(22) Filed: Jan. 14, 2025

(65) Prior Publication Data

US 2025/0148570 A1 May 8, 2025

Related U.S. Application Data

(63) Continuation of application No. 17/722,347, filed on Apr. 17, 2022, now Pat. No. 12,229,922, which is a continuation of application No. 16/507,910, filed on Jul. 10, 2019, now Pat. No. 11,308,591.

(60) Provisional application No. 62/696,346, filed on Jul. 11, 2018.

(51) Int. Cl.
*G06T 5/50* (2006.01)
*G06F 18/25* (2023.01)
*G06T 7/00* (2017.01)

(52) U.S. Cl.
CPC .............. *G06T 5/50* (2013.01); *G06F 18/251* (2023.01); *G06T 7/0012* (2013.01); *G06T 2207/10088* (2013.01); *G06T 2207/10136* (2013.01)

(58) Field of Classification Search
CPC ..................... G06T 5/50; G06T 7/0012; G06T 2207/10136; G06T 2207/10088; G06K 9/6289
See application file for complete search history.

(56) References Cited

U.S. PATENT DOCUMENTS

| | | | |
|---|---|---|---|
| 4,028,725 A | 6/1977 | Lewis |
| 4,907,296 A | 3/1990 | Blecha |
| 5,262,871 A | 11/1993 | Wilder |
| 5,856,811 A | 1/1999 | Shih |
| 5,859,921 A | 1/1999 | Suzuki |
| 6,091,546 A | 7/2000 | Spitzer |
| 6,163,336 A | 12/2000 | Richards |
| 6,198,485 B1 | 3/2001 | Mack |
| 6,307,526 B1 | 10/2001 | Mann |
| 6,434,280 B1 | 8/2002 | Peleg |
| 6,486,799 B1 | 11/2002 | Still |
| 6,661,495 B1 | 12/2003 | Popovich |

(Continued)

OTHER PUBLICATIONS

Brattain et al. (Machine learning for medical ultrasound: status, methods, and future opportunities. Abdom Radiol (NY). Apr. 2018;43 (4):786-799. doi: 10.1007/s00261-018-1517-0. PMID: 29492605; PMCID: PMC5886811.

(Continued)

*Primary Examiner* — Frank F Huang

(74) *Attorney, Agent, or Firm* — Nixon Peabody LLP

(57) ABSTRACT

Various computational methods and techniques are presented to increase the lateral and axial resolution of an ultrasound imager in order to allow a medical practitioner to use an ultrasound imager in real time to obtain a 3D map of a portion of a body with a resolution that is comparable to an MRI machine.

20 Claims, 2 Drawing Sheets acquiring, via an ultrasound imager, a first image corresponding to a first slice of a volume and having a first resolution receiving, from a memory unit, a training image corresponding to a second slice of the volume and having a second resolution higher than the first resolution, at least a portion of the second slice of the volume corresponding to at least a portion of the first slice executing an image resolution enhancement procedure to increase the image resolution of a subset of the first image based at least in part on the training image

(56) References Cited

U.S. PATENT DOCUMENTS

| | | | |
|---|---|---|---|
| 6,766,067 | B2 | 7/2004 | Freeman |
| 6,850,629 | B2 | 2/2005 | Jeon |
| 7,023,464 | B1 | 4/2006 | Harada |
| 7,331,671 | B2 | 2/2008 | Hammoud |
| 7,391,887 | B2 | 6/2008 | Durnell |
| 7,492,926 | B2 | 2/2009 | Kang |
| 7,538,326 | B2 | 5/2009 | Johnson |
| 7,697,024 | B2 | 4/2010 | Currivan |
| 7,715,658 | B2 | 5/2010 | Cho |
| 7,894,666 | B2 | 2/2011 | Mitarai |
| 8,014,632 | B2 | 9/2011 | Matsumoto |
| 8,139,089 | B2 | 3/2012 | Doyle |
| 8,159,519 | B2 | 4/2012 | Kurtz |
| 8,189,100 | B2 | 5/2012 | Li |
| 8,305,899 | B2 | 11/2012 | Luo |
| 8,432,492 | B2 | 4/2013 | Deigmoeller |
| 8,872,910 | B1 | 10/2014 | Vaziri |
| 9,230,140 | B1 | 1/2016 | Ackley |
| 9,438,491 | B1 | 9/2016 | Kwok |
| 9,438,819 | B2 | 9/2016 | Van Broeck |
| 9,618,746 | B2 | 4/2017 | Browne |
| 9,674,490 | B2 | 6/2017 | Koravadi |
| 9,727,790 | B1 | 8/2017 | Vaziri |
| 9,779,311 | B2 | 10/2017 | Lee |
| 9,858,676 | B2 | 1/2018 | Bostick |
| 9,864,372 | B2 | 1/2018 | Chen |
| 10,039,445 | B1 | 8/2018 | Torch |
| 10,064,552 | B1 | 9/2018 | Vaziri |
| 10,708,514 | B2 | 7/2020 | Haltmaier |
| 11,051,782 | B1 * | 7/2021 | Douglas .............. A61B 6/5217 |
| 11,189,017 | B1 | 11/2021 | Baqai |
| 11,287,262 | B2 | 3/2022 | Dooley |
| 12,198,301 | B2 * | 1/2025 | Zhang ........................ G06T 5/94 |
| 12,226,547 | B2 * | 2/2025 | Toro Estrella ...... A61L 27/3633 |
| 12,303,162 | B2 * | 5/2025 | Wen ..................... A61B 8/4444 |
| 12,303,228 | B2 * | 5/2025 | Vaziri ................. A61B 5/0022 |
| 12,464,093 | B2 * | 11/2025 | Vaziri .................... H04N 7/183 |
| D1,107,916 | S * | 12/2025 | Lewis .......................... D24/155 |
| 12,490,992 | B2 * | 12/2025 | Perler ................. A61B 17/151 |
| 12,507,864 | B2 * | 12/2025 | Zhao ..................... A61B 1/0005 |
| 12,541,180 | B2 * | 2/2026 | Rakshit .................. B33Y 50/02 |
| 2003/0122930 | A1 | 7/2003 | Schofield |
| 2004/0212882 | A1 | 10/2004 | Liang |
| 2004/0218834 | A1 | 11/2004 | Bishop |
| 2005/0046698 | A1 | 3/2005 | Knight |
| 2006/0033992 | A1 | 2/2006 | Solomon |
| 2007/0041663 | A1 | 2/2007 | Cho |
| 2007/0115349 | A1 | 5/2007 | Currivan |
| 2008/0010060 | A1 | 1/2008 | Asano |
| 2008/0030592 | A1 | 2/2008 | Border |
| 2008/0036875 | A1 | 2/2008 | Jones |
| 2008/0198324 | A1 | 8/2008 | Fuziak |
| 2008/0291295 | A1 | 11/2008 | Kato |
| 2008/0297589 | A1 | 12/2008 | Kurtz |
| 2009/0136158 | A1 | 5/2009 | Tamura |
| 2009/0189974 | A1 | 7/2009 | Deering |
| 2009/0210786 | A1 | 8/2009 | Suzuki |
| 2009/0219224 | A1 | 9/2009 | Elg |
| 2010/0053555 | A1 | 3/2010 | Enriquez |
| 2010/0103276 | A1 | 4/2010 | Border |
| 2010/0128135 | A1 | 5/2010 | Filipovich |
| 2010/0149073 | A1 | 6/2010 | Chaum |
| 2010/0157078 | A1 | 6/2010 | Atanassov |
| 2010/0157079 | A1 | 6/2010 | Atanassov |
| 2010/0165287 | A1 | 7/2010 | Pienimaa |
| 2010/0208207 | A1 | 8/2010 | Connell II |
| 2010/0240988 | A1 | 9/2010 | Varga |
| 2010/0254630 | A1 | 10/2010 | Ali |
| 2010/0277619 | A1 | 11/2010 | Scarff |
| 2010/0289941 | A1 | 11/2010 | Ito |
| 2010/0290668 | A1 | 11/2010 | Friedman |
| 2010/0290685 | A1 * | 11/2010 | Wein ........................ G06T 7/33 382/131 |
| 2011/0064327 | A1 | 3/2011 | Dagher |
| 2011/0263946 | A1 | 10/2011 | El Kaliouby |
| 2011/0279666 | A1 | 11/2011 | Strömbom |
| 2012/0086780 | A1 | 4/2012 | Sharma |
| 2012/0257005 | A1 | 10/2012 | Browne |
| 2013/0106911 | A1 | 5/2013 | Salsman |
| 2013/0121525 | A1 | 5/2013 | Chen |
| 2013/0242057 | A1 | 9/2013 | Hong |
| 2014/0146153 | A1 | 5/2014 | Birnkrant |
| 2014/0267890 | A1 | 9/2014 | Lelescu |
| 2014/0313335 | A1 | 10/2014 | Koravadi |
| 2015/0009550 | A1 | 1/2015 | Misago |
| 2015/0209002 | A1 * | 7/2015 | De Beni .............. A61B 8/5261 600/411 |
| 2016/0012280 | A1 | 1/2016 | Ito |
| 2016/0179093 | A1 | 6/2016 | Prokhorov |
| 2016/0225192 | A1 | 8/2016 | Jones |
| 2017/0007351 | A1 | 1/2017 | Yu |
| 2017/0019599 | A1 | 1/2017 | Muramatsu |
| 2017/0099479 | A1 | 4/2017 | Browd |
| 2017/0142312 | A1 | 5/2017 | Dal Mutto |
| 2017/0181802 | A1 | 6/2017 | Sachs |
| 2017/0225336 | A1 | 8/2017 | Deyle |
| 2017/0322410 | A1 | 11/2017 | Watson |
| 2017/0360578 | A1 * | 12/2017 | Shin ........................ B33Y 50/00 |
| 2018/0012413 | A1 | 1/2018 | Jones |
| 2018/0188892 | A1 | 7/2018 | Levac |
| 2018/0330473 | A1 * | 11/2018 | Foi ........................... G06T 7/337 |
| 2019/0175214 | A1 * | 6/2019 | Wood .................... A61B 8/4209 |
| 2019/0254754 | A1 | 8/2019 | Johnson |
| 2019/0272336 | A1 | 9/2019 | Ciecko |
| 2020/0041261 | A1 | 2/2020 | Bernstein |
| 2020/0077033 | A1 | 3/2020 | Chan |
| 2020/0117025 | A1 | 4/2020 | Sauer |
| 2020/0330179 | A1 | 10/2020 | Ton |
| 2021/0067764 | A1 | 3/2021 | Shau |

OTHER PUBLICATIONS

F. Coly et al. "Ultrasound Orientation Sensor", BS thesis, Worcester Polytechnic Institute. Apr. 25, 2019.

A Zandifar, R. Duraiswami, L. S. Davis, A video-based framework for the analysis of presentations/ posters, 2003 (Year: 2003) 10 pages.

Z. Zalevsky, D. Mendlovic, Optical Superresolution, 2004 (Year: 2004) 261 pages.

"A High Speed Eye Tracking System with Robust Pupil Center Estimation Algorithm", Proceedings of the 29th Ammal International Conference of the IEEE EMBS, 25 Kyon, France, pp. 3331-3334, Aug. 2007.

"A Novel Method of Video-Based Pupil Tracking", Proceedings of the 2009 IEEE International Conference on Systems, Man and Cybernetics, San Antonio, Tex., USA—pp. 1255-1262, Oct. 2009.

Athanasios Papoulis; A New Algorithm in Spectral Analysis and Band-Limited Extrapolation; IEEE Transactions on Circuits and Systems, Sep. 1975; vol. CAS-22, No. 9; pp. 735-742.

Barbara Zitova et al.; Image Registration Methods: a Survey; Department of Image Processing; Institute of Information Theory and Automation Academy of Sciences of the Szech Republic; Image and Vision Computing; pp. 977-1000.

B. K. Gunturk, "Super-resolution imaging", in Compu-tational Photography Methods and Applications, by R. Lukac, CRC Press, 2010 [Abstract Provided].

Cheng et al. Developing a Real-Time Identify-and-Locate System for the Blind. Workshop on Computer Vision Applications for the Visually Impaired, James Coughlan and Roberto Manduchi, Oct. 2008, Marseille, France.

Danny Keren et al.; Image Sequence Enhancement Using Sub-pixel Displacements; Department of computer science; The Hebrew University of Jerusalem; 1988 IEEE; pp. 742-746.

D. Li, D. Winfield and D. Parkhurst, "Starburst: A Hybrid algorithm for video based eye tracking combining feature-based and model-based approaches", Iowa State Univer-sity, Ames, Iowa.

Edward R. Dowski, Jr. et al.; Extended Depth of Field Through Wave-Front Coding; Apr. 10, 1995; Optical Society of America; vol. 34, No. 11; Applied Optics pp. 1859-1866.

(56) References Cited

OTHER PUBLICATIONS

Eran Gur and Zeev Zalevsky; Single-Image Digital Super-Resolution a Revised Gerchberg-Papoulis Algorithm; AENG International Journal of Computer Science; Nov. 17, 2007; pp. 1-5.

Extrema.m, http:/lwww.malhworks.com/matlabcentral/fileexchange/12275-extrema-m- extrema2-m, Sep. 14, 2006.

Eyelink User Manual, SR Research Lid., Copyright 2005-2008, 134 pages.

Eyelink Data Viewer User's Manual, SR Research Lid., Copyright 2002-2008, 149 pages.

Fritz Gleyo, Microsoft May Make Life-Sized Cortana in Person for HoloLens, (Dec. 14, 2015).

Guestrin et al. "General Theory of Remote Gaze Estimation Using the Pupil Center and Corneal Reflections", IEEE Trans. Biomedical Eng., vol. 53, No. 6, pp. 1124-1133, Jun. 2006.

Jessi Hempel, Project HoloLens: Our Exclusive Hands-On With Microsoft's Holographic Goggles, (Jan. 21, 2015).

John Bardsley et al.; Blind Iterative Restoration of Images With Spatially-Varying Blur; 9 pages.

J. Goodman, Introduction to Fourier Optics, rd edition, 160-165, McGraw-Hill, 1988.

Jordan Novet, Microsoft could build a life-sized Cortana for HoloLens, https://www.technologyrecord.com/Article/introducing-microsoft-hololens-development- edition-48296.

Kennet Kubala et al.; Reducing Complexity in Computational Imaging Systems; CDM Optics, Inc.; Sep. 8, J003; vol. 11, No. 18; Optics Express; pp. 2102-2108.

Lees et al. (Ultrasound Imaging in Three and Four Dimensions, Seminars in Ultrasound, CT, and MR/, vol. 22, No. 1 Feb. 2001: pp. 85-105, (Year: 2001).

Lindsay James, Introducing Microsoft HoloLens Development Edition, https://blogs.windows.com/ :levices/2015/04/30/build-2015-a-closer-look-at-the-microsoft- hololens-hardware/.

Lisa Gottesfeld Brown; A Survey of Image Registration Techniques; Department of Computer Science; Columbia University; Jan. 12, 1992; pp. 1-60.

Malcolm et al. Combining topdown processes to guide eye movements during real-world scene search. Journal of Vision, 10(2):4, p. 1-11 (2010).

Maria E. Angelopoulou et al.; FPGA-based Real-lime Super-Resolution on an Adaptive Image Sensor; Department of Electrical and Electronic Engineering, Imperial College London; 9 pages.

Maria E. Angelopoulou et al.; Robust Real-Time Super-Resolution on FPGA and an Application to Video Enhancement; Imperial College London; ACM Journal Name; Sep. 2008; vol. V, No. N; pp. 1-27.

Moreno et al. Classification of visual and linguistic tasks using eye-movement features; Journal of Vision (2014) 14 (3):11, 1-18.

Oliver Bowen et al.; Real-Time Image Super Resolution Using an FPGA; Department of Electrical and Electronic Engineering; Imperial College London; 2008 IEEE; pp. 89-94.

Patrick Vandewalle et al.; A Frequency Domain Approach to Registration of Aliased Images with Application to Super-resolution; Ecole Polytechnique Federal de Lausanne, School of Computer and Communication Sciences; Department of Electrical Engineering and Computer Sciences, University of California; EU RAS IP Journal on Applied Signal Processing; vol. 2006, Article ID 71459, pp. 1-14.

P. C. Hansen, J. G. Nagy, D. P. O'Leary, Deblurring Images: matrices, Spectra and Filtering, SIAM (2006) [Abstract Provided].

P. Milanfar, Super-Resolution Imaging, CRC Press (2011) [Abstract Provided].

Pravin Bhat et al.; Using Photographs to Enhance Videos of a Static Scene; University of Washington; Microsoft Research; Adobe Systems; University of California; The Eurographics Association 2007; pp. 1-12.

R. W. Gerchberg, "Super-resolution through error energy reduction", Optica Acta, vol. 21, No. 9, pp. 709-720,(1974).

S. Chaudhuri, Super-Resolution Imaging, Kluwer Aca-demic Publishers (2001) [Abstract Provided].

Sang-Hyuck Lee et al.; Breaking Diffraction Limit of a Small F-Number Compact Camera Using Wavefront Coding; Center for Information Storage Device; Department of Mechanical Engineering, Yonsei University, Shinchondong, Sudaemungu, Seoul 120-749, Korea; Sep. 1, 2008; vol. 16, No. 18; pp. 13569-13578.

Suk Hwan Lim and Amnon Silverstein; Estimation and Removal of Motion Blur by Capturing Two Images With Different Exposures; HP Laboratories and NVidia Corp.; HPL-2008-170; Oct. 21, 2008; 8 pages.

S.-W Jung and S.-J. Ko, "Image deblurring using multi-exposed images" in Computational Photography 65 Methods and Applications, by R. Lukac, CRC Press, 2010. [Abstract Provided].

Todd Holmdahl, Build 2015: A closer look at the Microsoft HoloLens hardware, https://blogs.windows.com/ :levices/2015/04/30/build-2015-a-closer-look-at-the-microsoft- hololens-hardware/.

Tod R. Lauer; Deconvolution With a Spatially-Variant PSF; National Optical Astronomy Observatory; Tucson, AZ; arXiv:astro-ph/0208247v1; Aug. 12, 2002; 7 pages.

V. Barmore, Iterative-Interpolation Super-Resolution Image Reconstruction, Springer (2009) [Abstract Provided].

W. Thomas Cathey et al.; New Paradigm for Imaging Systems; Optical Society of America; Applied Optics; Oct. 10, 2002; vol. 41, No. 29; pp. 6080-6092.

William T. Freeman et al.; Example-Based Super-Resolution; Mitsubishi Electric Research Labs; Mar./Apr. J002; IEEE Computer Graphics and Applications; pp. 56-65.

Sawhney, H. et al.; "Hybrid Stereo Camera: An IBR Approach for Synthesis of Very High Resolution Stereoscopic Image Sequences"; AC SIGGRAPH, pp. 451-460; 2001 (10 pages).

Zitnick, L. et al.; "Stereo for Image-Based Rendering Using Image Over-Segmentation"; International Journal of Computer Visions; 2006 (32 pages).

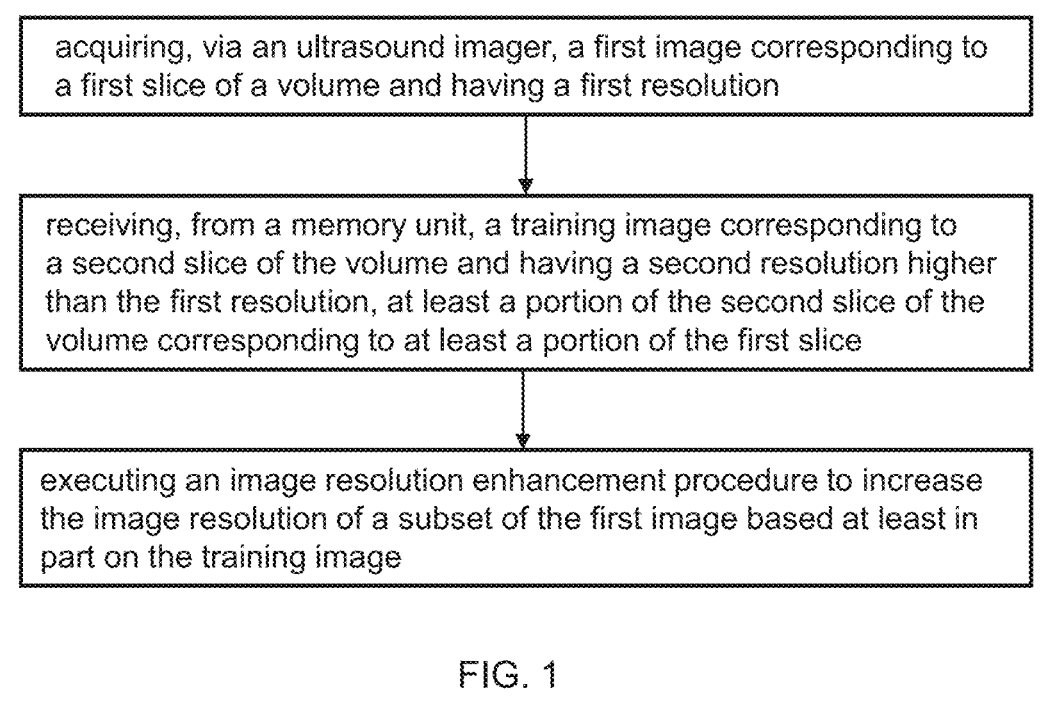

* cited by examiner acquiring, via an ultrasound imager, a first image corresponding to
a first slice of a volume and having a first resolution receiving, from a memory unit, a training image corresponding to
a second slice of the volume and having a second resolution higher
than the first resolution, at least a portion of the second slice of the
volume corresponding to at least a portion of the first slice executing an image resolution enhancement procedure to increase
the image resolution of a subset of the first image based at least in
part on the training image

FIG. 1

METHOD AND APPARATUS FOR A SOFTWARE ENABLED HIGH RESOLUTION ULTRASOUND IMAGING DEVICE

CROSS-REFERENCE TO RELATED APPLICATIONS

This application is a continuation of U.S. patent application Ser. No. 17/722,347, filed on Apr. 17, 2022, now allowed, which is a continuation of U.S. patent application Ser. No. 16/507,910, filed on Jul. 10, 2019, now U.S. Pat. No. 11,308,591, issued on Apr. 19, 2022, which claims the benefit of, and priority to, U.S. Provisional Application No. 62/696,346, filed on Jul. 11, 2018, each of which is hereby incorporated by reference herein in its entirety.

TECHNICAL FIELD

Embodiments of this invention relate to devices and methods for enhancing images captured by an ultrasound imaging device. In particular, the resolution of a low resolution image of an object captured by an ultrasound imaging device is improved via at least one higher resolution image taken of at least a portion of the same or a similar object.

BACKGROUND

MRI and ultrasound imagers are two of the main medical imaging devices that are used to see inside a living organism non-intrusively. Current MRI systems are huge, bulky, slow and expensive. Additionally, they can't be used for real time applications by medical practitioners. A physical therapist, for example, needs to know how the tissues, ligaments or muscles respond to various exercises or stretches or how much they have healed or improved. Also medical practitioners often need to assess the impact of extra force when for example they stretch a muscle. They also need to know the nature of an obstacle when stretching leads to pain or it is not possible beyond a limit, as a result of an injury. Is there a piece of broken bone or a detached ligament? Currently, physical therapists can't see inside an organ or a body part that they interact with. Instead, they try to infer, sense, or gauge the body's reaction in order to decide about the best course of action. If they could see the inside before and after an exercise or in real time, they could make better and faster decisions which could lead to shorter recovery time for patients and lower cost for health care providers. In other words, it will be hugely beneficial to both patients and care providers to have a real time or even near real time high resolution images of an area of interest. Ultrasound imagers are much smaller and less expensive than MRI machines and they can provide real time images. However, the images from ultrasound imagers are noisy and have much less image resolution (details) than MRI images.

SUMMARY

MRI machines can generate high resolution images of a portion of a living organism but they are big, bulky and expensive. Additionally, it takes days to get the results back. Ultrasound imagers are compact and low cost and can generate images in real time. An object of this invention is to improve the resolution of the ultrasound imagers using computational techniques so that ultrasound imagers are used more often by medical practitioners. This will reduce the healthcare cost and make it possible for more medical facilities to have accurate imaging devices.

BRIEF DESCRIPTION OF THE DRAWINGS

FIG. 1 shows exemplary steps of an imaging method, according to certain aspects of the present disclosure.

DETAILS OF THE SOLUTIONS

Figure 2:
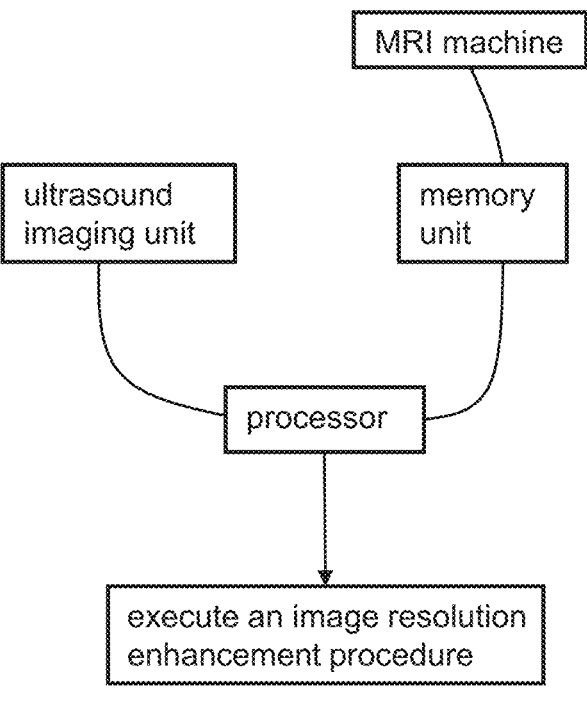
FIG. 2 shows a schematic block diagram of an imaging apparatus, according to certain aspects of the present disclosure.

To improve the resolution and to lower the noise in ultrasound imagers, in this disclosure, many imaging systems and configurations are presented. Each solution has its own advantages and may be the best depending on the circumstance.

In the first imaging system, high resolution images from a volume of interest or a portion of a body is captured using an MRI machine. These images are high resolution 2D slices of a volume or a portion of a body and they are fused together to create a high-resolution 3D map of the volume of interest. These MRI images and the constructed 3D map are stored in a database and at least one slice of the 3-D map is used as a training image or a high resolution reference image to increase the resolution of a corresponding ultrasound image.

When an ultrasound image is captured, the relative location of the imager's head with respect to the body part is used to generate a corresponding 2D slice from the 3D map of the body part. A pattern recognition algorithm can be used to find a slice from the 3D map that best matches the ultrasound image. At this stage, we will have two images: a low resolution from the ultrasound imager and a high resolution image generated from the 3D map. Next a bandwidth extrapolation technique is used to enhance the ultrasound image using high resolution image in an iterative fashion. The ultrasound imager will be equipped with a 9-axis accelerometer in order to relate various ultrasound images to each other. These ultrasound images can al so be combined to create a new 3D map of the body part or volume of interest. The advantage is that this later 3D map can be created very quickly. It is also possible to feed the MRI images to a computer that controls the ultrasound imager. A medical practitioner will select a slice of interest from the 3D MRI map and requests for a corresponding slice using the ultrasound imager. The starting point (location) of the ultrasound imager is decided by the medical practitioner and the ultrasound imager uses the 9-axes accelerometer to fine tune its position before capturing an image and displaying it on a screen.

The second approach is to use multi ultrasound imagers, similar to multi-camera imaging approach disclosed in the U.S. patent application Ser. No. 15/400,399. The depth of view of an ultrasound imager is inversely proportional with the frequency of the ultrasound waves used by the ultrasound machine. An ultrasound imager with higher frequency penetrates less in the body but it creates an image that its axial resolution is higher than another ultrasound imager with a lower frequency. Lateral resolution is a function of the beam angle. A wider beam angle (larger field of view) results in a lower lateral resolution than a narrower angle beam (smaller field of view). As already disclosed in the U.S. patent application Ser. No. 15/400,399, one can fuse (combine) a low resolution image and a higher resolution image that at least partially overlap to generate a higher resolution version of the low resolution image. In doing so, a high resolution image of a slice of an organ or part of a body is obtained. By combining many of such slices, a high resolution 3D map of the volume is obtained without a need for an MRI machine.

Another method to improve the resolution of an ultrasound imager is to use publicly available images as reference. A medical practitioner will interact with a computer program installed on a computer to select a part of a body from a menu and also select a region of interest from a map provided via the menu on a display. Once a part of a body is selected, the program on the computer will access the general description and features of the part or parts. The user can additionally input what areas within the part of the body might have been damaged. These suspected damaged areas will be enhanced once the image resolution of the surrounding healthy areas is improved. With these inputs, the program will have an estimate of how an image may look like and where the soft and hard tissues might be at. The program will use the reflectivity and the shapes of various parts within the area of interest as well. This in effect allows creating a smart ultrasound imager that uses some prior knowledge before creating an image. Presently, an ultrasound imager only creates an output image and it's the task of a practitioner to use her own knowledge to evaluate an ultrasound image. By applying rules, restrictions and a number of other known information about an area or volume of interest, a high resolution image of at least one cross section of the volume of interest is created and portions of the image that does not follow the general rules or lack the expected properties are marked. This makes the task of a medical practitioner much easier while providing images with a higher resolution and quality than a standard ultrasound imager. This method is in effect an application of machine learning and artificial intelligence to ultrasound imaging.

For certain areas of an ultrasound image, a training image or a property of an organ or a tissue is used or taken into account to remove the noise or increase the resolution of the ultrasound image. A training image may be an image from an MRI machine or from a public database. Rules are extracted from a database of similar images using artificial intelligence. An artificial intelligent program looks for common features in a volume or in a plane or in a slice or a cross-section of the volume. For example, when a torn ligament is studied, high resolution images of the surrounding bones and other tissues can be used to let the imager know how the healthy area surrounding the ligament look like. The healthy area image portion will be used to enhance the image of the area in question. As a result, the image of the torn ligament can be significantly enhanced and its resolution can be increased.

Another method to obtain higher resolution images from an ultrasound imager is to use a technique similar to multiframe sub-pixel super-resolution technique. In this method, the lateral resolution of an ultrasound imager is improved by shifting the imaging head in small increments and taking an image at each step. An actuator is used to move the imaging head and an accelerometer is used to measure and control the shifts accurately. The location of the imager with respect to the body part is monitored and recorded for each recorded image frame and several images are taken in succession with lateral shifts with respect to each other. The captured several images are mapped into a higher resolution grid and image registration is used to properly align the images and combine them to create a higher resolution image.

Resolution of an ultrasound imager is determined by its frequency. Larger frequencies result in higher resolution images. However, higher frequencies penetrate less in a tissue. We suggest combining two ultrasound images captured via a low frequency and high frequency ultrasound imager to create a high resolution ultrasound image with sufficient penetration depth through a tissue. Only one imager will be active at a time and the two images will take pictures alternatively and provide captured images to a processor. The processor will use those images to generate at least a single high resolution image. In fact, by using a range of ultrasound frequencies, we can obtain a number of images with different resolutions and depths. Such multiresolution images when combined properly with a bandwidth extrapolation technique could result in a single high resolution image with sufficient depth and lateral and axial resolution.

In some applications, to shorten the time required for image capturing, an imaging head is used that is deformable to easily match the contour of a portion of a body. The imaging head will include many imaging blocks. Depending on the resultant contour, at least one imaging block is fired up and the remaining blocks are used to record the reflected and scattered ultrasound waves sent by the at least one block The information from all the capturing blocks is used to create a single image of a cross-section or slice of a portion of a body.

I claim:

1. An ultrasound imaging apparatus comprising:
   at least one ultrasound imaging unit configured to:
      direct a first beam of soundwaves having a first frequency and a first beam width toward a volume to generate first image data that is reproducible as a first image of a first slice of the volume, the first image having a first axial resolution in the direction of the beam and a first lateral resolution transverse to the direction of the beam; and
      direct a second beam of soundwaves having a second frequency and a second beam width toward the volume to generate second image data that is reproducible as a second image of a second slice of the volume, the second image having a second axial resolution and a second lateral resolution, at least a portion of the second image corresponding to at least a portion of the first image; and
   a processor in communication with the at least one ultrasound imaging unit, the processor configured to:
      execute an image resolution enhancement procedure to generate an enhanced first image of the first slice of the volume, the enhanced first image having an increase in at least one of the first axial image resolution and the first lateral image resolution of at least a subset of the first image of the first slice of the volume based at least in part on the second image.

2. The ultrasound imaging apparatus of claim 1, wherein the second frequency is higher than the first frequency, the second beam angle is narrower than the first beam angle, and the image resolution enhancement procedure increases the first axial image resolution and the first lateral image resolution of the at least a subset of the first image of the first slice of the volume based at least in part on the second image.

3. The ultrasound imaging apparatus of claim 1, wherein the second frequency is higher than the first frequency, the second beam angle is the same as or wider than the first beam angle, and the image resolution enhancement procedure increases the axial image resolution of the at least a subset of the first image of the first slice of the volume based at least in part on the second image.

4. The ultrasound imaging apparatus of claim 1, wherein the second frequency is the same as the first frequency, the second beam angle is narrower than the first beam angle, and the image resolution enhancement procedure increases the first lateral image resolution of the at least a subset of the first image of the first slice of the volume based at least in part on the second image.

5. The ultrasound imaging apparatus of claim 1, wherein the image resolution enhancement procedure increases the at least one of the first axial image resolution and the first lateral image resolution of an entirety of the first image of the first slice of the volume.

6. The ultrasound imaging apparatus of claim 1, wherein the processor is configured to store data reproducible as the at least a subset of the first image of the first slice of the volume in a memory device of the ultrasound imaging apparatus.

7. The ultrasound imaging apparatus of claim 1, wherein the at least one ultrasound imaging unit is configured to alternatingly direct the first beam and direct the second beam.

8. The ultrasound imaging apparatus of claim 1, wherein the processor is further configured to capture the position and orientation of the at least one ultrasound imaging unit via a 9-axis accelerometer when each of the first beam and the second beam of soundwaves is directed toward the volume.

9. The ultrasound imaging apparatus of claim 8, wherein the processor is configured to combine a plurality of the enhanced first images of the first slice of the volume into a three dimensional image of the volume.

10. The ultrasound imaging apparatus of claim 1, wherein the image resolution enhancement procedure is iterative bandwidth extrapolation.

11. An ultrasound imaging method comprising:
    directing, via at least one first ultrasound imaging unit, a first beam of soundwaves having a first frequency and a first beam width toward a volume to generate first image data that is reproducible as a first image of a first slice of the volume, the first image having a first axial resolution in the direction of the beam and a first lateral resolution transverse to the direction of the beam; and
    directing, via the at least one first ultrasound imaging unit, a second beam of soundwaves having a second frequency and a second beam width toward the volume to generate second image data that is reproducible as a second image of a second slice of the volume, the second image having a second axial resolution and a second lateral resolution, at least a portion of the second image corresponding to at least a portion of the first image; and
    executing, via a processor in communication with the at least one ultrasound imaging unit, an image resolution enhancement procedure to generate an enhanced first image of the first slice of the volume, the enhanced first image having an increase in at least one of the first axial image resolution and the first lateral image resolution of at least a subset of the first image of the first slice of the volume based at least in part on the second image.

12. The ultrasound imaging method of claim 11, wherein the second frequency is higher than the first frequency, the second beam angle is narrower than the first beam angle, and the image resolution enhancement procedure increases the first axial image resolution and the first lateral image resolution of the at least a subset of the first image of the first slice of the volume based at least in part on the second image.

13. The ultrasound imaging method of claim 11, wherein the second frequency is higher than the first frequency, the second beam angle is the same as or wider than the first beam angle, and the image resolution enhancement procedure increases the axial image resolution of the at least a subset of the first image of the first slice of the volume based at least in part on the second image.

14. The ultrasound imaging method of claim 11, wherein the second frequency is the same as the first frequency, the second beam angle is narrower than the first beam angle, and the image resolution enhancement procedure increases the first lateral image resolution of the at least a subset of the first image of the first slice of the volume based at least in part on the second image.

15. The ultrasound imaging method of claim 11, wherein the image resolution enhancement procedure increases the at least one of the first axial image resolution and the first lateral image resolution of an entirety of the first image of the first slice of the volume.

16. The ultrasound imaging method of claim 11, further comprising storing, via the processor, data reproducible as the at least a subset of the first image of the first slice of the volume in a memory device of the ultrasound imaging apparatus.

17. The ultrasound imaging method of claim 11, wherein the at least one ultrasound imaging unit alternates between directing the first beam and directing the second beam.

18. The ultrasound imaging method of claim 11, further comprising capturing, via the processor and a 9-axis accelerometer, the position and orientation of the at least one ultrasound imaging unit when the at least one ultrasound imaging unit is directing each of the first beam of soundwaves and the second beam of soundwaves toward the volume.

19. The ultrasound imaging method of claim 18, further comprising, via the processor, combining a plurality of the enhanced first images for a plurality of the first slices of the volume into a three dimensional image of the volume.

20. The ultrasound imaging method of claim 11, wherein the image resolution enhancement procedure is iterative bandwidth extrapolation.

* * * * *